United States Patent Office 3,420,783
Patented Jan. 7, 1969

3,420,783
PROCESS FOR PRODUCING IRON-MOLYBDATE CATALYST FOR OXIDATION OF METHANOL TO FORMALDEHYDE
Sten-Åke Bergstrand, Ingenjorsvagen, Perstorp, Sweden, assignor to Perstorp Aktiebolag
Filed Nov. 1, 1965, Ser. No. 505,832
Claims priority, application Sweden, Dec. 28, 1964, 15,685/64
U.S. Cl. 252—470                6 Claims
Int. Cl. B01j 11/22

ABSTRACT OF THE DISCLOSURE

Production of iron-molybdate catalysts by finely grinding dried iron-molybdate, mixing the ground powder with water to produce a moisture mass containing 37–39% moisture, pelletizing the mixture within 90 minutes of said mixing and drying the pellets obtained.

---

Figure 1:
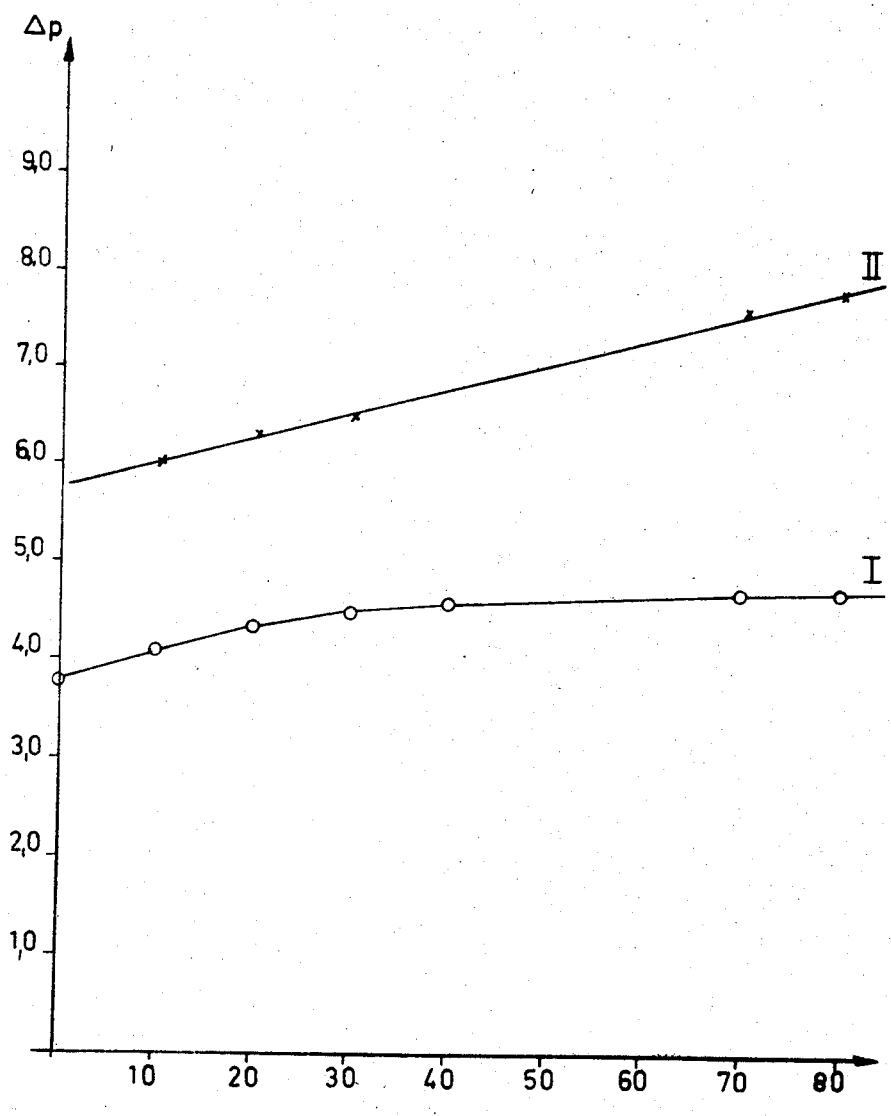

The present invention relates to a process for producing a catalyst, which is intended to be used for producing formaldehyde by oxidation of methanol with excess of air. The catalysts, which are included in the invention, are those consisting of iron-molybdate.

Such catalysts have been described earlier for example in the U.S. patent specification 1,913,405. This patent is one of the basic ones within the field and it relates to a catalyst consisting of, e.g., the above-mentioned molybdate. This catalyst is self-supporting and accordingly it does not have to be supported in the catalyst tubes. One of the disadvantages with said catalyst is that it is fragile and accordingly troublesome to transport. The catalyst has therefore been modified and a precursor catalyst, which is easier to transport, has been produced. This precursor catalyst contains more water than the former catalyst and it requires some activation before it supports the catalytic oxidation of methanol to formaldehyde in a satisfactory way. Such catalysts are described in the U.S. Patents 2,812,309 and 2,849,492. However, the activation of the precursor catalyst requires no special measures and the normal breaking in period after inserting the precursor into the catalyst tubes is sufficient to bring about the necessary activation.

Said catalyst types have been used and are still in use on an industrial scale. Their time of duration in the tubes is generally one year. Thereafter they have to be replaced and regenerated or they must be resolved for the purpose of producing a new catalyst. The duration of the catalysts is determined by several factors, such as the pressure fall in the catalyst tubes, which increases with time on account of crumbling of the granules. The catalyst granules must not be too small. For this reason the fine catalyst powder is sifted away from the finished mass. This powder cannot be used as it is, and it represents accordingly an economical load.

The present invention concerns a process for producing iron-molybdate catalysts, which are intended to be used for the catalytic oxidation of methanol to formaldehyde with excess of air. According to the invention a solution of an iron salt and a solution of a molybdate are mixed for precipitating iron-molybdate, which is thereafter dried in an oven after optionally previous air-drying and washing. The process is characterized in that the oven-dried product is ground fine, whereupon a suitable amount of water is added, with stirring, whereafter the wet mass is pelletized and dried.

To produce the catalyst one starts with water solutions of, e.g., ammonium-molybdate and an iron salt such as iron chloride. These mixtures are combined for precipitating the catalyst, which is then filtered off in a suitable way and washed, if necessary. This is described, e.g., in the above-mentioned patents and is not included within the scope of the present invention.

The filter cake thus obtained and which suitably has a ratio measured in percent by weight $MoO_3/Fe_2O_3$ of between 5 and 6 may either be air-dried or dried directly in an oven. The air-drying, if such is considered suitable, is carried out during about two days, and the water content in the filter cake is reduced from approx. 55 to 30 percent. The humidity in the filter cake is finally reduced by drying in an oven to below 5 percent, usually to approx. 3–3½ percent. The drying is then suitably maintained for two days at a low temperature, about 80° C., and is finished at a temperature of 105–107° C. during about one day. If the mass in this stage is set aside for some time, it may again absorb some water and may have a humidity of for example 12 percent.

The dry filter cake is subjected to a careful fine grinding and sifting, a powder mixture having a largest grain size of 0.6 mm. being obtained. The major part of the mass has, however, a grain size of 0.2–0.3 mm., but it may be highly contaminated with smaller particles. The dry powder mass thus obtained is thereafter admixed with a suitable amount of water before pelletizing. This step in the manufacturing process is very critical. The pelletizing will fail completely, if the mass contains too much or too little water. The limits of the water content are very narrow. The optimum water content is 38 percent and may deviate therefrom by only 1 percent in each direction, i.e. the water content must be between 37–39 percent. The water is added as a thin jet within a period of two minutes while stirring. The way of adding the water is also of importance. This adding and the stirring must be finished within ten minutes. At this point the mass has a temperature of approx. 25° C. If the mass is left in this condition without being further worked, an exothermic reaction starts, and the temperature will rise to 50–60° C. after a couple of hours. The reaction taking place may suitably be compared with the hardening of cement, and it results in a lumpy product, which cannot be pelletized. The mass must therefore be pelletized within a period of at most one hour and a half, preferably one hour. The earlier this can be carried out the better. The pelletizing may be performed in a suitable apparatus, e.g. a granulating machine of the type Alexanderwerke-granulator. The pellets obtained should have a dimension of about 3.5 mm.

The product may be passed directly into an oven for drying or it may be air-dried during, e.g. half a day before the oven-drying. The oven-drying should be carried out at approx. 100° C. and should suitably be maintained during a period of twelve hours. The water content of the final product is then lower than 5 percent.

By the granulating and the drying some crushing of the product occurs. The crumbs formed are returned to the step of fine grinding and are there mixed with the dried filter cake. By this means the manufacturing becomes very economical, as practically no losses occur.

The catalyst product, which is obtained by the process according to the invention works principally in the same way as formed known catalysts of similar type. However, it differs very advantageously in a few ways compared with the former known catalysts.

Figure 2:
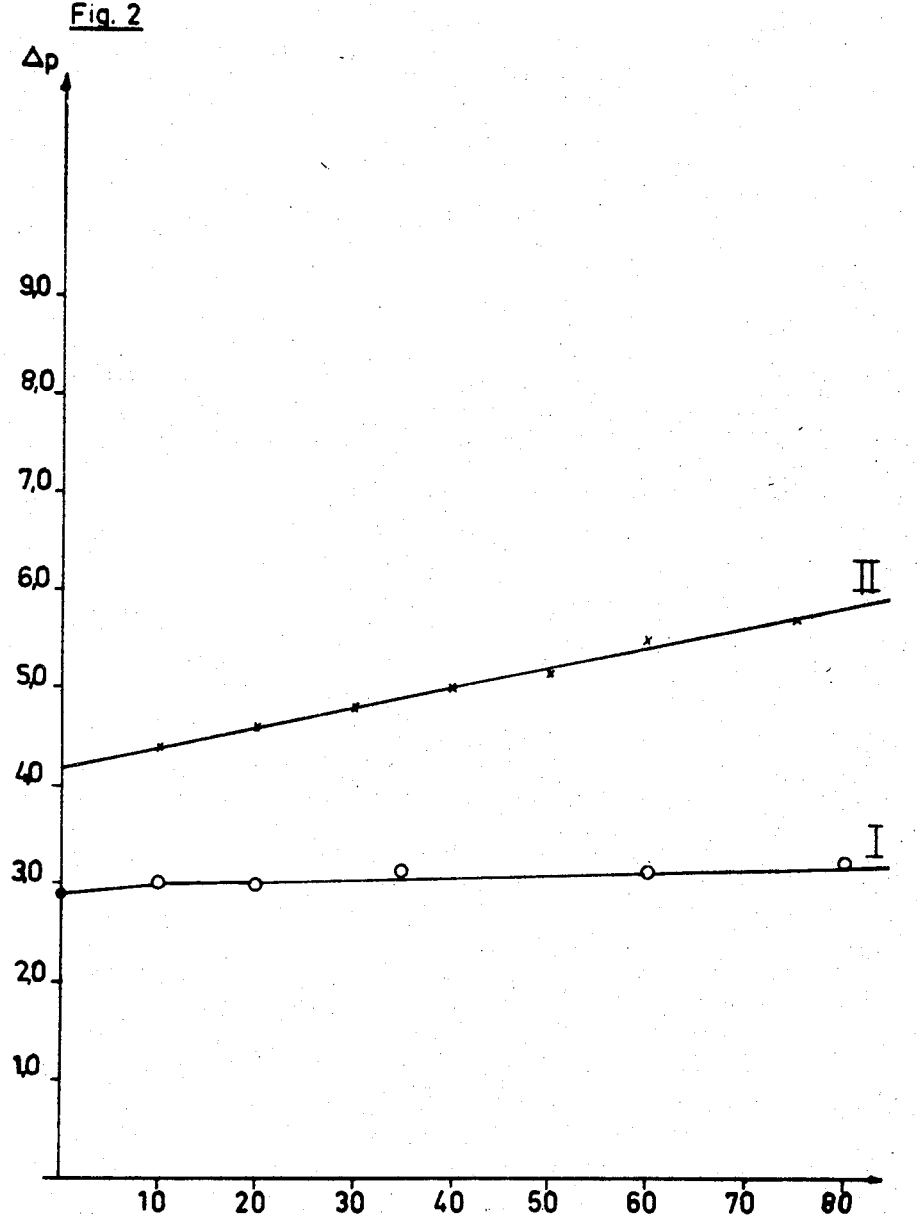

As mentioned in the introduction the catalysts have a limited life, which mainly depends on the increase in pressure fall with time. The catalyst according to the present invention differs appreciably from the known ones at this point. This appears from the FIGURES 1 and 2. These show a pressure fall measured in metres water column as a function of the number of working days. The curve I relates to the catalyst according to the present invention and the curve II relates to a known catalyst. Both curves in FIGURE 1 have been plotted for a space velocity value of 12.7 m.³ gas per litre catalyst per hour, while the space velocity value in FIGURE 2 is 10.9. As is apparent from the figures, the curve I is quite different from curve II. Curve I starts appreciably much lower than curve II and has a much lesser declination and finally it runs almost parallel to the abscissa. The advantages with the catalyst according to the present invention are accordingly evident in this respect.

A further advantage with the catalyst consists in that the end product, the formalin solution, has a lower degree of acidity than what is common. This depends on a lower content of formic acid formed.

The present invention is not limited to the values and compositions shown in the description but can be modified in different ways within the scope of the invention.

I claim:

1. A process for the production of an iron-molybdate catalyst which comprises finely grinding a dried iron-molybdate, mixing the ground powder with an amount of water to produce a moistened mass containing 37–39% by weight of moisture, pelletizing the moistened mass within 90 minutes of mixing the water with the ground powder and then drying the pellets obtained.

2. A process according to claim 1, which comprises adding the water to the ground powder within a period of at most 10 minutes.

3. A process according to claim 1, wherein the dried, finely ground powder has a particle size of at most 0.6 mm.

4. A process according to claim 1, wherein any waste after the pelletizing and the drying is returned to the grinding step.

5. A process according to claim 1, wherein the moisture content before pelletizing is 38% by weight.

6. Catalyst produced according to claim 1.

References Cited

UNITED STATES PATENTS

| | | | |
|---|---|---|---|
| 2,812,309 | 11/1957 | Allyn et al. | 252—470 |
| 2,812,310 | 11/1957 | Walker et al. | 252—470 |
| 3,152,997 | 10/1964 | Natta et al. | 252—470 |

DANIEL E. WYMAN, *Primary Examiner.*

PAUL E. KONOPKA, *Assistant Examiner.*

U.S. Cl. X.R.

260—603